United States Patent
Righi et al.

(10) Patent No.: US 11,036,491 B1
(45) Date of Patent: *Jun. 15, 2021

(54) IDENTIFYING AND RESOLVING FIRMWARE COMPONENT DEPENDENCIES

(71) Applicant: AMERICAN MEGATRENDS INTERNATIONAL, LLC, Norcross, GA (US)

(72) Inventors: Stefano Righi, Lawrenceville, GA (US); Presanna Raman, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,406

(22) Filed: Nov. 1, 2019

Related U.S. Application Data

(63) Continuation of application No. 14/822,432, filed on Aug. 10, 2015, now Pat. No. 10,481,893.

(51) Int. Cl.
*G06F 8/65* (2018.01)
(52) U.S. Cl.
CPC ..................... *G06F 8/65* (2013.01)
(58) Field of Classification Search
CPC ..... G06F 8/61; G06F 8/65; G06F 8/71; G06F 9/44; G06F 13/00
See application file for complete search history.

(56) References Cited

U.S. PATENT DOCUMENTS

| | | |
|---|---|---|
| 6,487,713 B1 | 11/2002 | Cohen et al. |
| 7,818,730 B1 | 10/2010 | Ryan |
| 2003/0233493 A1 | 12/2003 | Boldon et al. |
| 2005/0210222 A1 | 9/2005 | Liu et al. |
| 2006/0101457 A1 | 5/2006 | Zweifel et al. |

(Continued)

OTHER PUBLICATIONS

Non Final Office action for U.S. Appl. No. 14/822,432, dated Oct. 13, 2016, Righi et al., "Identifying and Resolving Firmware Component Dependencies", 41 pp.

(Continued)

*Primary Examiner* — Duy Khuong T Nguyen
(74) *Attorney, Agent, or Firm* — Newport IP, LLC; Leonard J. Hope

(57) ABSTRACT

Technologies are disclosed herein for identifying and resolving firmware component dependencies within a firmware project. Dependency information is generated and stored for firmware components that can be used to create a firmware project. The dependency information may define one or more mandatory dependencies, optional dependencies, and/or incompatible dependencies. The dependency information for the firmware components in the firmware project is evaluated to identify any unsatisfied dependencies when a firmware project is opened, when a firmware component is added to a firmware project, when a firmware component in a firmware project is updated, or when the firmware project is built. If any unsatisfied dependencies are identified, the dependencies can be satisfied by adding a firmware component to the firmware project, updating a firmware component in the firmware project, or by removing a firmware component from the firmware project.

20 Claims, 4 Drawing Sheets

(56) References Cited

U.S. PATENT DOCUMENTS

| | | | |
|---|---|---|---|
| 2008/0059730 A1* | 3/2008 | Cepulis | G06F 11/1433 |
| | | | 711/161 |
| 2009/0328023 A1 | 12/2009 | Bestland et al. | |
| 2010/0251232 A1* | 9/2010 | Shinomiya | H04N 1/00973 |
| | | | 717/177 |
| 2011/0072423 A1 | 3/2011 | Fukata | |
| 2011/0239195 A1 | 9/2011 | Lin et al. | |
| 2012/0324417 A1 | 12/2012 | Somani et al. | |
| 2013/0275958 A1 | 10/2013 | Ivanov et al. | |
| 2014/0344799 A1 | 11/2014 | Thodati et al. | |
| 2014/0380340 A1 | 12/2014 | Knichel et al. | |
| 2015/0186125 A1 | 7/2015 | Avery et al. | |
| 2015/0199194 A1* | 7/2015 | Niwa | G06F 8/658 |
| | | | 717/170 |
| 2015/0355897 A1 | 12/2015 | Ford et al. | |
| 2016/0154657 A1 | 6/2016 | Lee | |

OTHER PUBLICATIONS

Final Office action for U.S. Appl. No. 14/822,432, dated May 5, 2017, Righi et al., "Identifying and Resolving Firmware Component Dependencies", 32 pp.

Non Final Office action for U.S. Appl. No. 14/822,432, dated Oct. 6, 2017, Righi et al., "Identifying and Resolving Firmware Component Dependencies", 53 pp.

Final Office action for U.S. Appl. No. 14/822,432, dated Apr. 12, 2018, Righi et al., "Identifying and Resolving Firmware Component Dependencies", 32 pp.

Non Final Office action for U.S. Appl. No. 14/822,432, dated Oct. 30, 2018, Righi et al., "Identifying and Resolving Firmware Component Dependencies", 40 pp.

Final Office action for U.S. Appl. No. 14/822,432, dated Feb. 26, 2019, Righi et al., "Identifying and Resolving Firmware Component Dependencies", 41 pp.

Notice of Allowance for U.S. Appl. No. 14/822,432, dated Jul. 2, 2019, Righi et al., "Identifying and Resolving Firmware Component Dependencies", 12 pp.

* cited by examiner

IDENTIFYING AND RESOLVING FIRMWARE COMPONENT DEPENDENCIES

CROSS-REFERENCE TO RELATED APPLICATION

This application is a continuation of U.S. patent application Ser. No. 14/822,432, filed Aug. 10, 2015, the content of which application is expressly incorporated herein by reference in its entirety.

BACKGROUND

Many computers utilize a firmware, such as a basic input/output system ("BIOS"), when powering on in order to prepare the computer to recognize and control various computing devices within the computer or connected to the computer. Such a firmware is typically stored on a non-volatile memory device within the computer. The firmware can be implemented by various firmware components, which are independent pieces of program code that provide some specific functionality within the firmware. For example, a firmware can include a component that provides support for a specific processor created by a specific manufacturer. Other types of components might also be utilized to support other types of hardware. Because of the virtually endless computer hardware configurations and manufacturers, a firmware is typically customized by including components that support varying computer configurations.

A firmware project is a firmware implementation that is tailored to a particular motherboard configuration and/or other types of hardware and/or software within a computer. A firmware project also includes a number of firmware components to support the different hardware components and to provide other types of functionality. The number and types of firmware components included with any given firmware project depends upon the various computing elements within the target computer for which the firmware is created and, potentially, other types of functionality that is desired to be provided by the computer. Consequently, when building a new firmware project for a specific computer configuration, many different firmware components will be utilized.

In some cases, the firmware components added to a firmware project are incompatible with one another. In other cases, firmware components might be added to a firmware project that are dependent upon other firmware components that are not present in the project. In either case, it might not be possible to build the firmware project or, once built, the firmware might operate incorrectly. It can, however, be difficult for a software developer to determine when components upon which other components are dependent are missing from a firmware project or when incompatible firmware components are present in a firmware project.

It is with respect to these considerations and others that the disclosure made herein is provided.

SUMMARY

The technologies disclosed herein provide functionality for identifying and resolving dependencies between components in a firmware project. Through an implementation of the disclosed technologies, the firmware components upon which a firmware project is dependent and/or firmware components that are incompatible with a firmware project can be identified in an automated fashion. The developer of the firmware project can then be notified of the unsatisfied dependencies. Additionally, any unsatisfied dependencies can be resolved in an automated manner.

According to one implementation disclosed herein, dependency information is generated and stored for firmware components that can be used within a firmware project. The dependency information may define one or more mandatory dependencies, optional dependencies, and/or incompatible dependencies. The dependency information for the firmware components in the firmware project is evaluated to identify any unsatisfied dependencies when a firmware project is opened, when a firmware component is added to a firmware project, or when a firmware component in a firmware project is updated. If any unsatisfied dependencies are identified, the dependencies can be satisfied by adding a firmware component to the firmware project, updating a firmware component already in the firmware project, or by removing a firmware component from the firmware project.

The above-described subject matter can be implemented as a computer-controlled apparatus, a computer-implemented process, a computing system, or as an article of manufacture such as a non-transitory computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
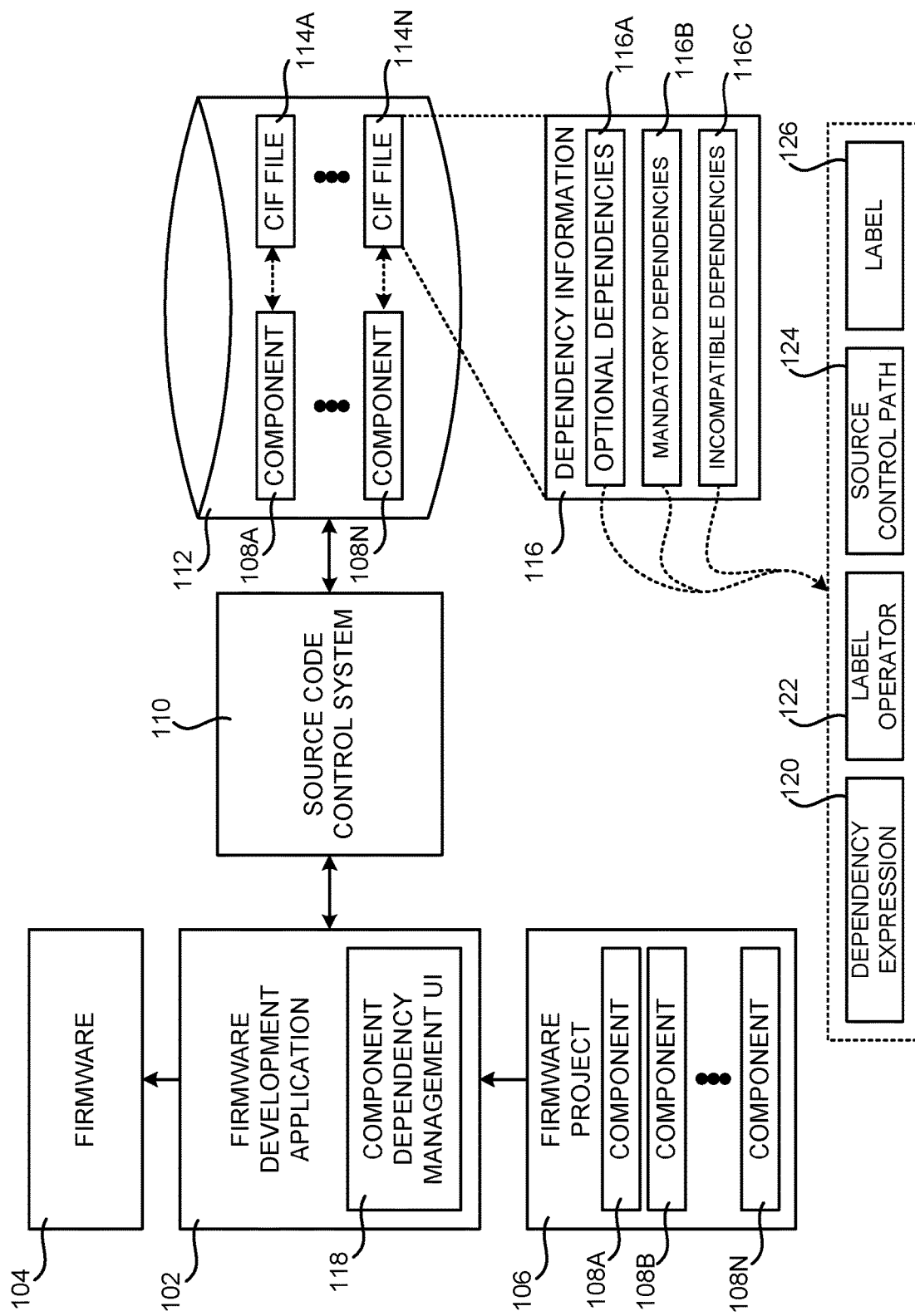
FIG. 1 is a block diagram showing aspects of a system disclosed herein for identifying and resolving dependencies between components in a firmware project.

The following detailed description is directed to technologies for identifying and resolving dependencies among components in a firmware project. While the subject matter described herein is presented in the general context of program modules that execute in conjunction with the execution of an operating system and application programs on a computer system, those skilled in the art will recognize that other implementations can be performed in combination with other types of program modules.

Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

The subject matter described herein can be practiced in a distributed computing environment where tasks are performed by remote processing devices that are linked through a communications network, and wherein program modules can be located in both local and remote memory storage devices. It should be appreciated, however, that the implementations described herein can also be utilized in conjunction with stand-alone computer systems and other types of computing devices. It should also be appreciated that the embodiments presented herein can be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several FIGURES, aspects of a computing system and methodology for identifying and resolving dependencies between components in a firmware project will be described.

FIG. 1 is a block diagram showing aspects of a system disclosed herein for identifying and resolving component dependencies within a firmware project. As shown in FIG. 1, the various configurations disclosed herein can be implemented in conjunction with a firmware development application 102. The firmware application 102 is an application that provides functionality for assisting a user in creating a computer system firmware 104, such as a BIOS firmware or an EFI-compatible firmware.

In one particular implementation, the firmware development application 102 is the VISUAL EBIOS ("VEB") firmware development application from AMERICAN MEGATRENDS, INC. ("AMI") of Norcross, Ga. VEB is a firmware development application 102 that provides a graphical environment for assisting in the development of computer system firmware 104, such as a BIOS or an EFI-compatible firmware. The technologies disclosed herein might also be implemented in conjunction with other types of firmware development applications 102 from other manufacturers. The technologies disclosed herein might also be implemented in other types of development environments.

As also shown in FIG. 1, the firmware development application 102 provides functionality for allowing a user to create a firmware project 106. A firmware project 106 is a firmware implementation that is tailored to a particular motherboard configuration and/or other types of hardware and/or software within a computer. A firmware project 106 also includes a number of firmware components 108A-108N (which might be referred to herein as "components 108" or a "component 108") to support the different hardware components and to provide other types of functionality.

The number and types of firmware components 108 included with any given firmware project 106 depends upon the various computing elements within the target computer for which the firmware 104 is to be created and, potentially, other types of functionality that is desired to be provided by the computer. Consequently, when building a new firmware project 106 for a specific computer configuration, many different firmware components 108 will be utilized.

As shown in FIG. 1, the firmware development application 102 can operate in conjunction with a source code control system 110. As known to those skilled in the art, a source code control system 110 provides functionality for managing source code and, potentially, other types of software components. For example, and without limitation, although not illustrated in this manner in FIG. 1, the source code control system 110 might utilize a suitable data store 112 to store the firmware project 106. The source code control system 110 might also store firmware components 108A-108N that can be utilized in a firmware project 106. The source code control system 110 might also store other types of data and provide other types of functionality not described specifically herein.

In some cases, the firmware components 108 added to a firmware project 106 are incompatible with one another. In other cases, firmware components 108 might be added to a firmware project 106 that are dependent upon other firmware components 108 that are not present in the project 106. In either case, it might not be possible to build the firmware project 106 or, once built, the firmware 104 might operate incorrectly. It can, however, be difficult for a software developer to determine when components 108 upon which other components 108 are dependent are missing from a firmware project 106 or when incompatible firmware components 108 are present in a firmware project 106. The technologies disclosed herein attempt to address these, and potentially other, considerations.

In an attempt to address the considerations set forth above, and potentially others, the firmware development application 102 is configured with functionality for identifying and resolving firmware component 108 dependencies in a firmware project 106. In order to enable this functionality, dependency information 116 is defined for the components 108 that can be utilized in a firmware project 106. In one configuration, the dependency information 116 is stored in component information files ("CIF") 114A-114N that are associated with the components 108A-108N, respectively. The CIF files 114 are human readable files that define various aspects of the firmware components 108. The CIF files 114 can be stored by the source code control system 110. It should be appreciated that the dependency information 116 might be stored in other formats in other locations in other configurations. For example, and without limitation, the dependency information 116 is stored in a database in some configurations.

As shown in FIG. 1, the dependency information 116 for a particular component 108 can include optional dependencies 116A, mandatory dependencies 116B, and/or incompatible dependencies 116C. Optional dependencies 116A identify one or more firmware components 108 which, if present in a firmware project 106, must be of one or more specified versions. Mandatory dependencies 116B identify one or more versions of one or more firmware components 108 that must be present in a firmware project 106. Incompatible dependencies 116C identify one or more firmware components 108 that are incompatible with the firmware project 106 and, therefore, should not be present in the firmware project 106. Multiple optional dependencies 116A, mandatory dependencies 116B, and incompatible dependencies 116C can be specified.

In one configuration, the optional dependencies 116A, the mandatory dependencies 116B, and the incompatible dependencies 116C are specified using a dependency expression 120, a label operator 122, a source control path 124, and a label 126. The dependency expression 120 identifies a firmware component 108 upon which a dependency is to be defined. For example, the dependency expression 120 might specify a unique component reference name for a particular firmware component 108 for a dependency is to be defined.

The label operator 122 defines an operator for use in determining which versions of a firmware component 108 can be used to satisfy the specified dependency. For example, the label operator 122 might specify "BEFORE", which indicates that versions of the software component 108 less than or equal to a specified version number can be utilized to satisfy the dependency, "AT" which means that only the specified version of a firmware component 108 can be utilized to satisfy a dependency, or "AFTER" which means that versions greater than or equal to a specified version number of the firmware component 108 can be utilized to satisfy the dependency. If no label operator 122 is specified, then all versions of a firmware component 108 identified by the dependency expression 120 are supported.

The source control path 124 specifies the path within the source code control system 110 for the firmware component 108 that satisfies the specified dependency. The label 126 specifies the version of the firmware component 108 that the specified dependency is to be evaluated against. For example, the label 126 might specify a name of the firmware component 108 and include an appended version number of the firmware component 108 that is to be utilized to evaluate the dependency using the label operator 122. For example, a label 126 of "AMIMODULEPKG_23" indicates a version number of 23 for the firmware component 108 named "AMIMODULEPKG." The version numbers are monotonically increasing integers in one particular configuration.

As shown in FIG. 1, the firmware development application 102 can also be configured to provide a component dependency management UI 118. The component dependency management UI 118 is a graphical UI for defining, viewing, editing, and removing the dependency information 116. Additional details regarding the configuration and operation of the component dependency management UI 118 will be provided below with regard to FIG. 3.

As discussed briefly above, the firmware development application 102 may utilize the dependency information 116 to evaluate a firmware project 106 for unsatisfied dependencies at various points in time. For example, and without limitation, dependency information 116 for the firmware components 108 in a firmware project 106 is evaluated to identify any unsatisfied dependencies when the firmware project 106 is opened, when a firmware component 108 is added to the firmware project 106, or when a firmware component 108 in the firmware project 106 is updated. The dependency information 116 might also be utilized to identify any unsatisfied dependencies at other points in time. Additionally, a user may be permitted to specify when evaluation is to occur through an appropriate UI or other mechanism, and might be permitted to manually trigger such an evaluation.

If the firmware development application 102 identifies any unsatisfied dependencies, a user of the firmware development application 102 may be presented with information identifying the unsatisfied dependencies. Additionally, a request may be presented to the user asking the user whether the unsatisfied dependencies are to be resolved by the firmware development application 102.

If the user indicates that the unsatisfied dependencies should be resolved, the firmware development application 102 may satisfy the dependencies by adding a firmware component 108 to the firmware project 106 (e.g. a required version of a firmware component 108), by updating a firmware component 108 already present in the firmware project 106, or by removing a firmware component 108 (e.g. an incompatible firmware component 108) from the firmware project 106. Other actions might also be taken in order to resolve any unsatisfied dependencies in a firmware project 106.

Figure 2:
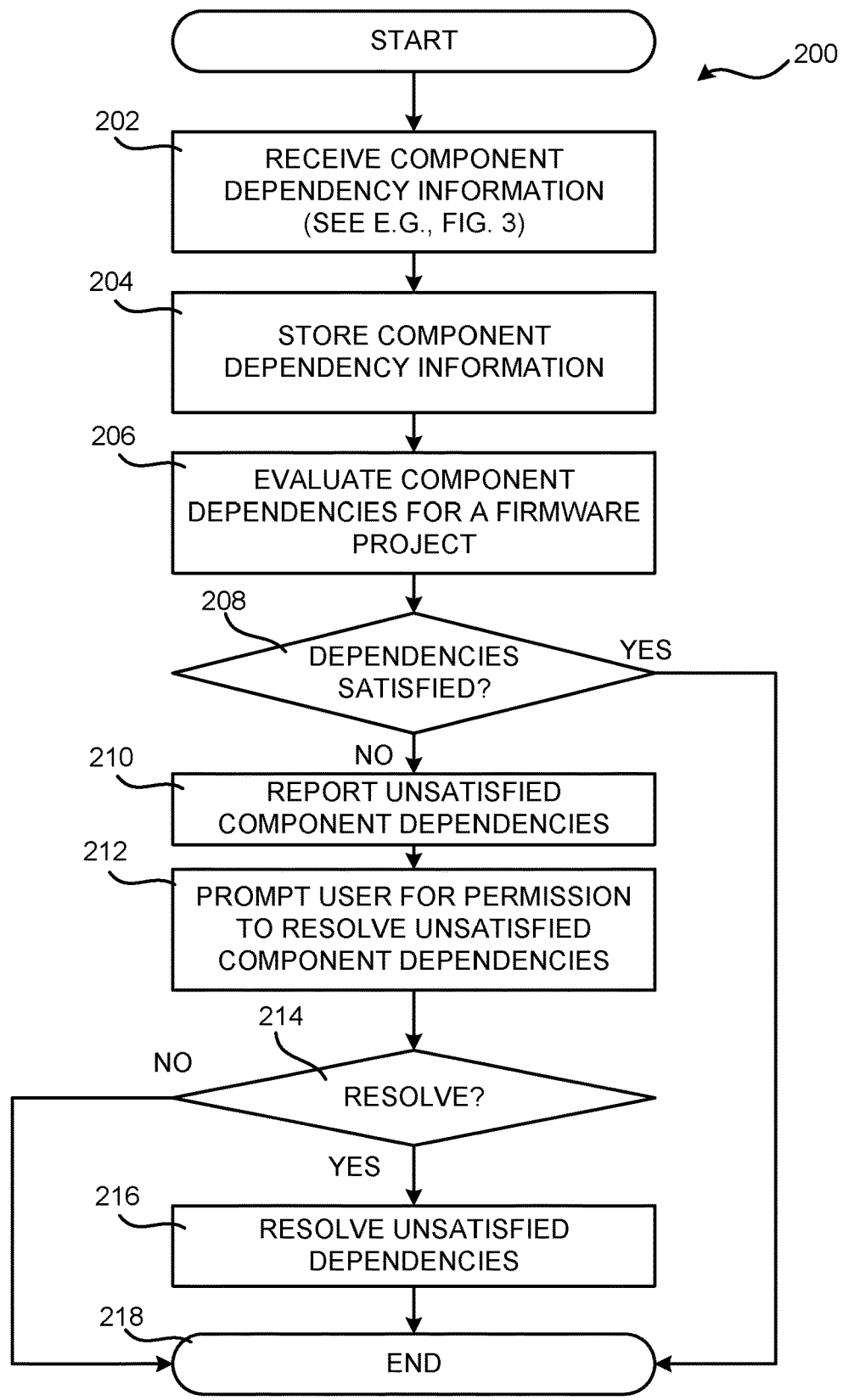
FIG. 2 is a flow diagram illustrating aspects of one method disclosed herein for identifying and resolving dependencies between components in a firmware project.

FIG. 2 is a flow diagram illustrating aspects of one method 200 disclosed herein for evaluating and resolving dependencies in a firmware project 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules can be implemented in software, in firmware, in special purpose digital logic, and any combination.

The routine 200 begins at operation 202, where the component dependency information 116 for the firmware components 108 is received. As discussed above (and in further detail below with regard to FIG. 3), the dependency information 116 can be generated manually, such as through the use of the component dependency management UI 118. In other configurations, the dependency information 116 is generated programmatically, such as through a static or dynamic analysis of the components 108. The dependency information 116 might also be obtained from other sources and/or using other mechanisms in other configurations.

From operation 202, the routine 200 proceeds to operation 204. At operation 204, the dependency information 116 is stored. As discussed above, in one particular configuration the dependency information 116 is stored in CIF files 114A-114N that are associated with the firmware components 108A-108N, respectively. The CIF files 114 can be stored by the source code control system 110 and/or by another system and/or in another location. The dependency information 116 can be stored in other ways in other configurations.

From operation 204, the routine 200 proceeds to operation 206, where the firmware development application 102 evaluates the component dependency information 116 for the components 108 in a firmware project 106 to identify any unsatisfied dependencies. As discussed above, for example, the firmware development application 102 might evaluate the dependency information 116 to identify any unsatisfied dependencies at the time firmware project 106 is opened, at the time a firmware component 108 is added to the firmware project 106, at the time a firmware component 108 in the firmware project 106 is updated, or at the time the firmware project 106 is built. In some configurations, the firmware development application 102 is also configured to check for recursive dependencies.

If any unsatisfied dependencies are identified, the routine 200 proceeds from operation 208 to operation 210. At operation 210, the unsatisfied component dependencies are reported to a user of the firmware development application 102. For example, an appropriate UI or other type of report may be generated and displayed that shows any incompatible firmware components 108, any missing firmware components 108, and/or any firmware components 108 that do not have the required version number as specified by the dependency information 116. Other types of information can also be provided regarding the unsatisfied dependencies.

From operation 210, the routine 200 proceeds to operation 212, where the firmware development application 102 can prompt a user for permission to resolve any identified unresolved component dependencies. For example, a dialog box or other type of graphical UI might be presented with information asking the user if the unsatisfied dependencies are to be resolved. If the user indicates that the unsatisfied dependencies are to be resolved, the routine 200 proceeds from operation 214 to operation 216.

At operation 216, the firmware development application 102 resolves the unsatisfied dependencies. As discussed above, this might include, but is not limited to, adding a firmware component 108 to the firmware project 106 (e.g. a required version of a firmware component 108), updating a firmware component 108 already contained in the firmware project 106 (i.e. a required version), and/or removing a firmware component 108 (e.g. an incompatible firmware component 108) from the firmware project 106. Other actions might also be taken in order to resolve any unsatisfied dependencies in a firmware project 106. From operation 216, the routine 200 proceeds to operation 218, where it ends.

Figure 3:
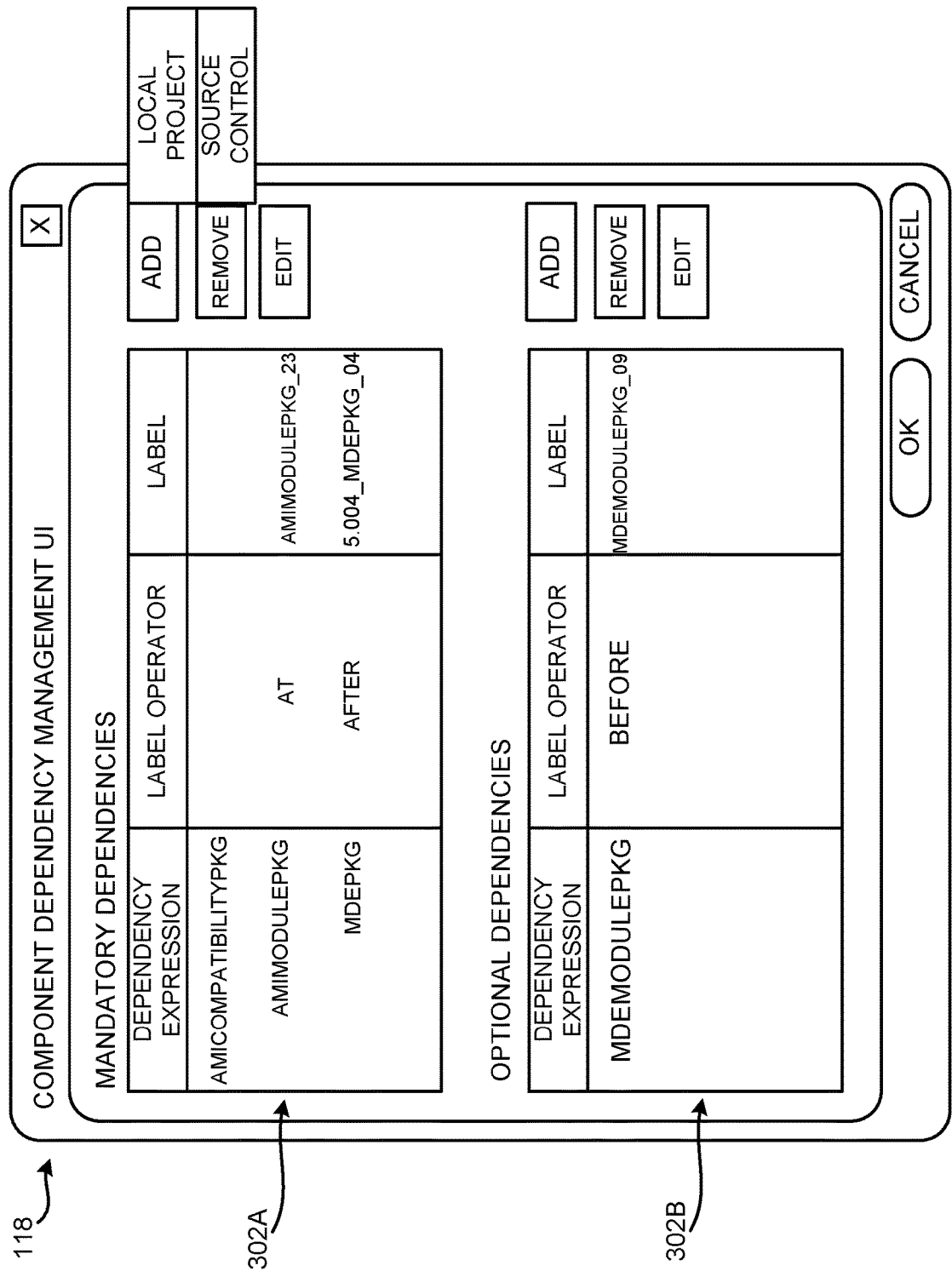
FIG. 3 is a user interface diagram showing aspects of an illustrative user interface ("UI") for defining, viewing, and editing dependency information for components in a firmware project.

FIG. 3 is a user interface diagram showing aspects of an illustrative UI 118 for defining, viewing, and editing dependency information for components 108 in a firmware project 106. The UI 118 can be presented in response to the selection of a firmware component 108 and providing a request to specify dependency information 116 for the firmware component 118.

As shown in FIG. 3, the UI includes a section 302A for defining mandatory dependencies 116B and a section 302B for defining optional dependencies 116A. In some configurations, the UI 118 also includes a section for defining one or more incompatible dependencies 116C. In other configurations, the sections 320 can be presented on separate UI tabs. Other arrangements can also be utilized.

Each section 302 includes columns corresponding to the dependency expression 120, the label operator 122, and the label 126. In the example shown in FIG. 3, for instance, a mandatory dependency 116B has been defined for the firmware component 108 named "AMICOMPATIBILITYPKG," In this case, no label operator has been specified indicating that at least some version of this firmware component 108 must be in a firmware project 106.

A mandatory dependency 116B has also been defined for the firmware component 108 named "AMIMODULEPKG." The "AT" label operator has been specified for this firmware component 108, indicating that the version of this firmware component must exactly match the version specified by the corresponding label 126. In this case, the label indicates that the version must be version "23". A mandatory dependency 116B has further been defined for the firmware component 108 named "MDEPKG." The "AFTER" label operator has been specified for this firmware component 108, indicating that the version of this firmware component must be greater than or equal to the version specified by the corresponding label 126. In this case, the label indicates that the version must be greater than or equal to version "04".

In the example shown in FIG. 3, an optional dependency 116A has also been specified for the firmware component named "MDEMODULEPKG." In this case, the "BEFORE" label has been specified, thereby indicating that if the named firmware component is present in the firmware project 106, the firmware component must have a version number less than or equal to the version number specified in the corresponding label 126. In this case, the label indicates that the version of the firmware component 108 must be less than or equal to version "09".

As also shown in FIG. 3, the sections 302 of the UI 118 also include UI controls for adding, removing, and editing the respective dependency information 116. If the UI control for adding new dependency information is selected, additional UI controls are presented as illustrated for allowing the user to select the firmware component 108 for which dependency information 116 is to be defined from the local project or from the source code control system 110.

If the user selects the source code control system 110, the user may then be permitted to select the firmware component 108 for which new dependency information 116 is to be created from the firmware components 108A-108N stored by the source code control system 110. The source control path 124 can then be added to the new dependency information 116, but is not shown in the UI 118 shown in FIG. 3. The source control path 124 is shown in the UI 118 in other configurations. The user can also select the label operator 122 and the label 126 for the entry. The user may select the "OK" UI control to have the defined dependency information 116 stored or select the "CANCEL" UI control to discard the edits.

It should be appreciated that the UI 118 shown in FIG. 3 is merely illustrative, and that other UI controls, arrangements of UI controls, and configurations might be utilized to add, edit, remove, and/or otherwise interact with the dependency information 116. The UI 118 shown in FIG. 3 should not be viewed as limiting in any fashion.

It should also be appreciated that, in some configurations, the process described above can be performed even when a network connection between the firmware development application 102 and the source code control system 110 is unavailable. In this case, the evaluation of dependencies may be limited to the firmware components 108 that are actually contained in the firmware project 106.

Figure 4:
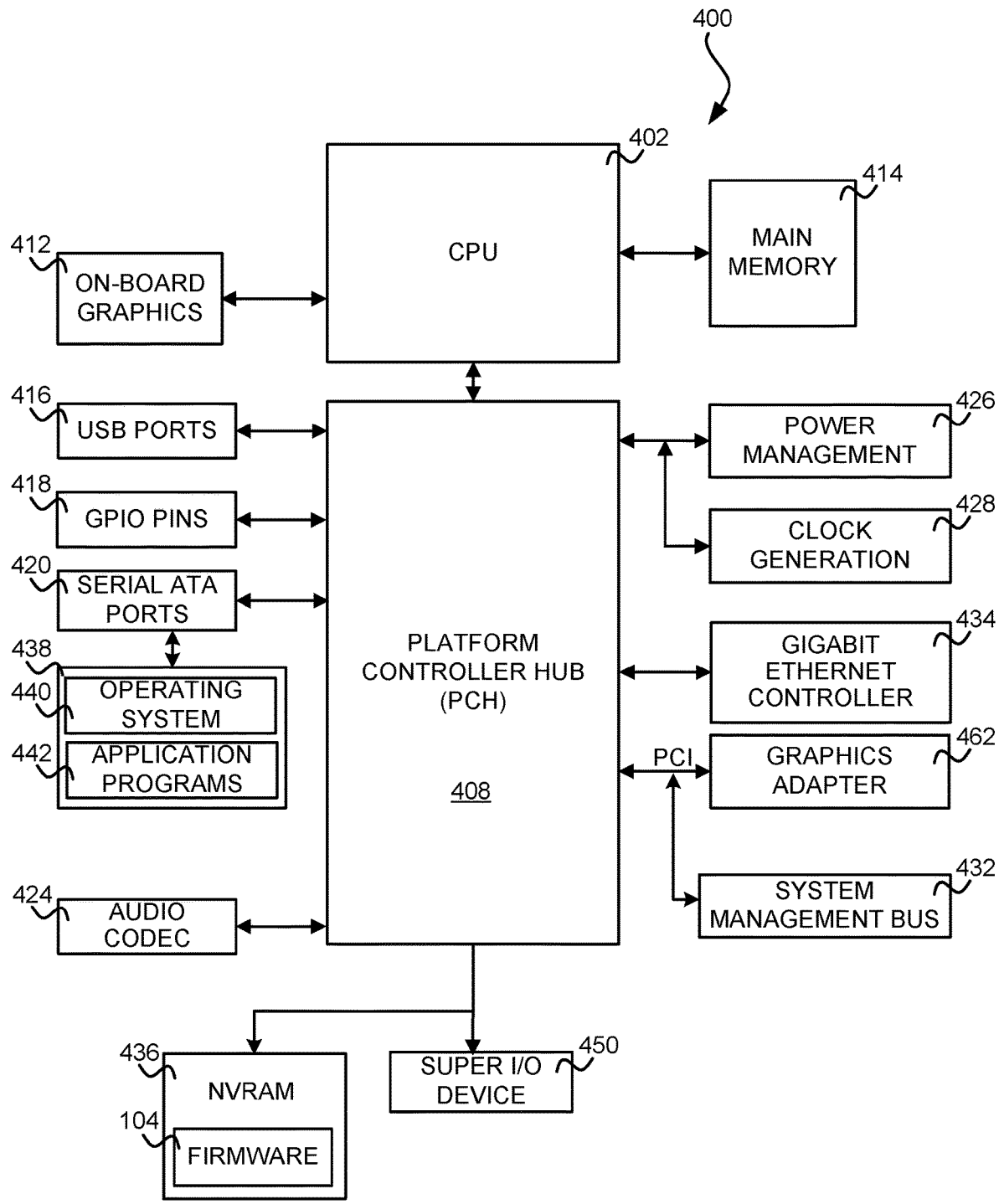
FIG. 4 is a computer architecture diagram showing a computer architecture suitable for implementing the various computer systems described herein.

Referring now to FIG. 4, an illustrative computer architecture for practicing the technologies disclosed herein will be described. It should be appreciated that although the embodiments described herein are discussed in the context of a conventional desktop or server computer, the embodiments can be utilized with virtually any type of computing device.

In order to provide the functionality described herein, the computing system 400 can include a baseboard, or "motherboard," which can be a printed circuit board to which a multitude of components or devices can be connected by way of a system bus or other electrical communication path. In one illustrative embodiment, a central processing unit ("CPU") 402 operates in conjunction with a Platform Controller Hub ("PCH") 408. The CPU 402 can be a standard central processor that performs arithmetic and logical operations necessary for the operation of the computing system 400. The computing system 400 can include a multitude of CPUs 402. Each CPU 402 might include multiple processing cores.

The CPU 402 provides an interface to a random access memory ("RAM") used as the main memory 414 in the computing system 400 and, possibly, to an on-board graphics adapter 412. The PCH 408 can provide an interface between the CPU 402 and the remainder of the computing system 400.

The PCH 408 can also be responsible for controlling many of the input/output functions of the computing system 400. In particular, the PCH 408 can provide one or more universal serial bus ("USB") ports 416, an audio codec 424, a gigabit Ethernet controller 434, and one or more general purpose input/output ("GPIO") pins 418. The USB ports 416 can include USB 2.0 ports, USB 3.0 ports and USB 3.1 ports among other types of USB ports. The audio codec 424 can include Intel High Definition Audio, Audio Codec '97 ("AC'97") and Dolby TrueHD among others. Power management circuitry 426 and clock generation circuitry 428 can also be utilized through the PCH 408.

The PCH 408 can also include functionality for providing networking functionality through a gigabit Ethernet controller 434. The gigabit Ethernet controller 434 is capable of connecting the computing system 400 to another computing system via a network. Connections which can be made by the gigabit Ethernet controller 434 can include LAN or WAN connections. LAN and WAN networking environments are commonplace in offices, enterprise-wide computer networks, intranets, and the Internet.

The PCH 408 can also provide a bus for interfacing peripheral card devices such as a graphics adapter 462. The bus can be implemented as a Peripheral Component Interconnect ("PCI") bus, a Peripheral Component Interconnect eXtended ("PCI-X") bus or a Peripheral Component Interconnect Express ("PCIe") bus among others. The PCH 408 can also provide a system management bus 432 for use in managing the various components of the computing system 400.

The PCH 408 is also configured to provide one or more interfaces for connecting mass storage devices to the computing system 400. For instance, according to an embodiment, the PCH 408 includes a serial advanced technology attachment ("SATA") adapter for providing one or more serial ATA ports 420. The serial ATA ports 420 can be connected to one or more mass storage devices storing an operating system 440 and application programs 442, such as the SATA disk drive 438. As known to those skilled in the art, an operating system 440 comprises a set of programs that control operations of a computer and allocation of resources. An application program 442 is software that runs on top of the operating system 440 software, or other runtime environment, and uses computer resources to perform application specific tasks desired by the user.

According to one embodiment of the invention, the operating system 440 comprises the LINUX operating system. According to another embodiment of the invention the operating system 440 comprises a version of the WINDOWS operating system from MICROSOFT CORPORATION. According to other embodiments, the operating system 440 can comprise the UNIX, SOLARIS, or APPLE OSX operating system. It should be appreciated that other operating systems can also be utilized.

The mass storage devices connected to the PCH 408, and their associated computer-readable storage media, provide non-volatile storage for the computing system 400. Although the description of computer-readable storage media contained herein refers to a mass storage device, such as a hard disk or CD-ROM drive, it should be appreciated by those skilled in the art that computer-readable storage media can be any available media that can be accessed by the computing system 400.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical disk storage, magnetic cassettes, magnetic tape, magnetic disk storage or other magnetic storage devices, or any other non-transitory medium which can be used to store the desired information and which can be accessed by the computing system 400.

A low pin count ("LPC") interface can also be provided by the PCH 408 for connecting a Super I/O device 450. The Super I/O device 450 is responsible for providing a number of input/output ports, including a keyboard port, a mouse port, a serial interface, a parallel port, and other types of input/output ports. The LPC interface can also connect a computer storage media such as a ROM or a flash memory such as a non-volatile random access memory ("NVRAM") 436 for storing a firmware 104 that includes program code containing the basic routines that help to start up the computing system 400 and to transfer information between elements within the computing system 400. Some examples of firmware 104 include a BIOS firmware, an EFI-compatible firmware, or an Open Firmware, among others.

It should be appreciated that the program modules disclosed herein, including the firmware 104, can include software instructions that, when loaded into the CPU 402 and executed, transform a general-purpose computing system into a special-purpose computing system customized to facilitate all, or part of, the operations disclosed herein. As detailed throughout this description, the program modules can provide various tools or techniques by which the computing system 400 can participate within the overall systems or operating environments using the components, logic flows, and/or data structures discussed herein.

The CPU 402 can be constructed from any number of transistors or other circuit elements, which can individually or collectively assume any number of states. More specifically, the CPU 402 can operate as a state machine or finite-state machine. Such a machine can be transformed to a second machine, or a specific machine, by loading executable instructions contained within the program modules. These computer-executable instructions can transform the CPU 402 by specifying how the CPU 402 transitions between states, thereby transforming the transistors or other circuit elements constituting the CPU 402 from a first machine to a second machine, wherein the second machine can be specifically configured to perform the operations disclosed herein. The states of either machine can also be transformed by receiving input from one or more user input devices, network interfaces (such as the gigabit Ethernet controller 434), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media; whether the storage media are characterized as primary or secondary storage; and the like. For example, if the storage media are implemented as semiconductor-based memory, the program modules can transform the physical state of the semiconductor memory when the software or firmware 104 is encoded therein. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the computing system 400 can comprise other types of computing devices, including hand-held computers, embedded computer systems, smartphones, tablet computing devices, and other types of computing devices known to those skilled in the art. It is also contemplated that the computing system 400 might not include all of the components shown in FIG. 4, can include other components that are not explicitly shown in FIG. 4, or can utilize an architecture completely different than that shown in FIG. 4.

Based on the foregoing, it should be appreciated that technologies for identifying and resolving dependencies among components 108 in a computer system firmware 104 have been provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer-implemented method, comprising:
   accessing dependency information for multiple firmware components in a firmware project, the dependency information defining a group of dependencies for the multiple firmware components, wherein a first dependency of the group of dependencies is defined using at least a dependency expression, a label operator, and a source control path;
   identifying, using the dependency information, an unsatisfied dependency in the firmware project;
   receiving input information indicating to resolve the unsatisfied dependency; and
   resolving the unsatisfied dependency by performing at least a first operation of a group of operations comprising updating a firmware component in the firmware project.

2. The method of claim 1, further comprising storing the dependency information in one or more component information files (CIFs) associated with the firmware components.

3. The method of claim 1, wherein the group of operations further comprises adding a first firmware component to the firmware project and removing a second firmware component from the firmware project.

4. The method of claim 1, wherein the group of dependencies comprises an optional dependency that identifies a firmware component that, when present in the firmware project, must be of a specified version.

5. The method of claim 1, wherein the group of dependencies comprises a mandatory dependency that identifies a version of a firmware component that must be present in the firmware project.

6. The method of claim 1, wherein the group of dependencies comprises an incompatible dependency that identifies a firmware component that is incompatible with the firmware project.

7. The method of claim 1, wherein the identifying comprises evaluating the dependency information in response to opening the firmware project by a firmware development application.

8. The method of claim 1, wherein the identifying comprises evaluating the dependency information in response to adding a firmware component to the firmware project.

9. The method of claim 1, wherein the identifying comprises evaluating the dependency information at a build time of the firmware project.

10. The method of claim 1, wherein the identifying comprises evaluating the dependency information in response to updating a first firmware component of the multiple firmware components.

11. An apparatus, comprising:
    at least one processor; and
    a computer-readable storage medium having instructions stored thereupon that, in response to being executed by the at least one processor, cause the apparatus to
       access dependency information for multiple firmware components in a firmware project, the dependency information defining a group of dependencies for the multiple firmware components, wherein a first dependency of the group of dependencies is defined using at least a dependency expression, a label operator, and a source control path;
       identify, using the dependency information, an unsatisfied dependency in the firmware project;
       receive input information indicating to resolve the unsatisfied dependency; and
       resolve the unsatisfied dependency by performing at least a first operation of a group of operations comprising updating a firmware component in the firmware project.

12. The apparatus of claim 11, wherein the group of dependencies comprises an optional dependency that identifies a firmware component that, when present in the firmware project, must be of a specified version.

13. The apparatus of claim 11, wherein the group of dependencies comprises a mandatory dependency that identifies a version of a firmware component that must be present in the firmware project.

14. The apparatus of claim 11, wherein the group of dependencies comprises an incompatible dependency that identifies a firmware component that is incompatible with the firmware project.

15. The apparatus of claim 11, wherein identifying, using the dependency information, an unsatisfied dependency in the firmware project comprises evaluating the dependency information in response to a firmware component being added to the firmware project, the firmware project being opened by a firmware development application, or a first firmware component of the multiple firmware components being updated.

16. The apparatus of claim 11, the group of operations further comprising adding a firmware component to the firmware project and removing a firmware component from the firmware project.

17. A non-transitory computer-readable storage medium having instructions stored thereupon which, in response to being executed by a processor, cause the processor to:
- access dependency information for multiple firmware components in a firmware project, the dependency information defining a group of dependencies for the multiple firmware components, wherein a first dependency of the group of dependencies is defined using at least a dependency expression, a label operator, and a source control path;
- identify, using the dependency information, an unsatisfied dependency in the firmware project;
- receive input information indicating to resolve the unsatisfied dependency; and
- resolve the unsatisfied dependency by performing at least a first operation of a group of operations comprising updating a firmware component in the firmware project.

18. The non-transitory computer-readable storage medium of claim 17, wherein the group of dependencies comprises an optional dependency that identifies a firmware component that, when present in the firmware project, must be of a specified version.

19. The non-transitory computer-readable storage medium of claim 17, wherein the group of dependencies comprises a mandatory dependency that identifies a version of a firmware component that must be present in the firmware project.

20. The non-transitory computer-readable storage medium of claim 17, wherein the group of dependencies comprises an incompatible dependency that identifies a firmware component that is incompatible with the firmware project.

* * * * *